(No Model.)

G. W. GRIFFIN.
MANUFACTURE OF SAWS.

No. 502,886. Patented Aug. 8, 1893.

Witnesses.
Fred S. Greenleaf
Louis N. Sowell

Inventor:
George W. Griffin
by Crosby & Gregory
Attys.

UNITED STATES PATENT OFFICE.

GEORGE W. GRIFFIN, OF FRANKLIN, NEW HAMPSHIRE.

MANUFACTURE OF SAWS.

SPECIFICATION forming part of Letters Patent No. 502,886, dated August 8, 1893.

Application filed July 23, 1892. Serial No. 441,054. (No model.)

*To all whom it may concern:*

Be it known that I, GEORGE W. GRIFFIN, of Franklin, county of Merrimac, State of New Hampshire, have invented an Improvement in Machines for and Method of Making Saw-Teeth, of which the following description, in connection with the accompanying drawings, is a specification, like letters and figures on the drawings representing like parts.

The teeth of hack and other narrow saws are now commonly formed by a chisel or tool which cuts into the edge of the blade and sets up the stock without removing any of the same, but the chisel or tool to form the teeth in this manner must enter the blade at an angle in order to set up the stock, the front or cutting edge of a tooth being left at the angle at which the forming tool entered the blade; but for certain classes of work the front or cutting edge of the teeth should for the best results stand at a greater angle or more nearly vertical with relation to the blade than it is possible to form them by the tool entering at the necessary angle. In accordance with this invention, I have therefore combined with the tooth forming tool what I term a staking tool which acts upon the tooth previously formed and sets the same back or otherwise changes its form to straighten or change the angle of its front cutting edge, the staking tool also preferably at the same time rounding out or shaping the bottom of the tooth at its cutting side to provide a free clearance between it and the next adjacent tooth and to give to the tooth greater cutting power and also render the same less liable to crack during and after the hardening process.

Figure 1:
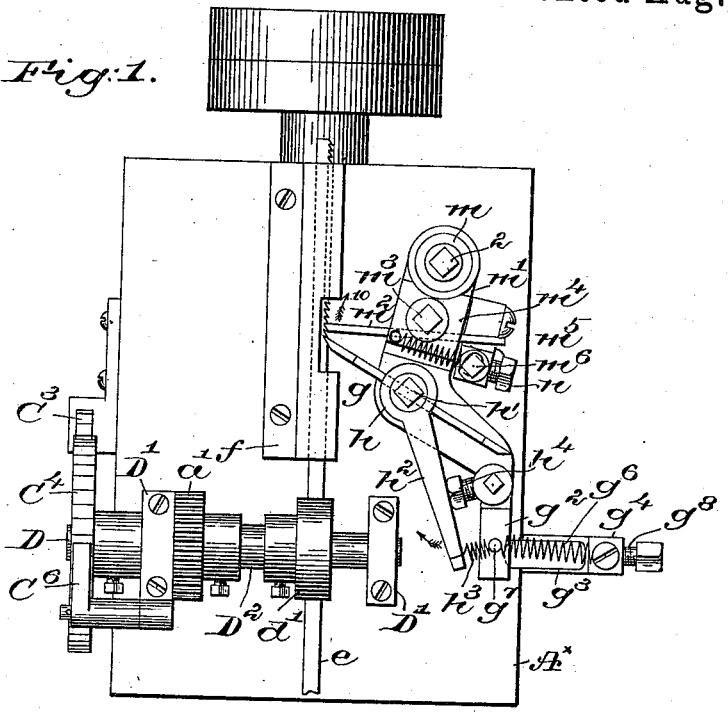
Figure 2:
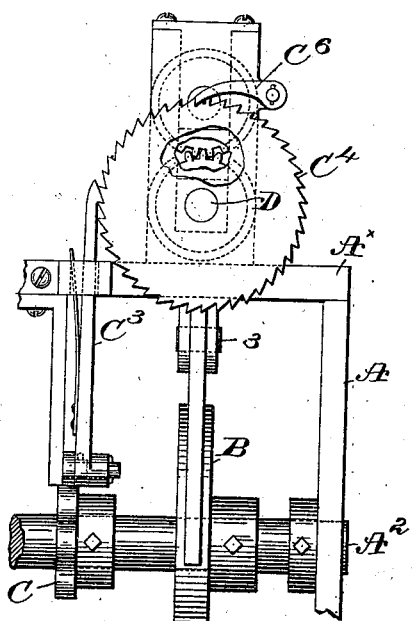
Figure 3:
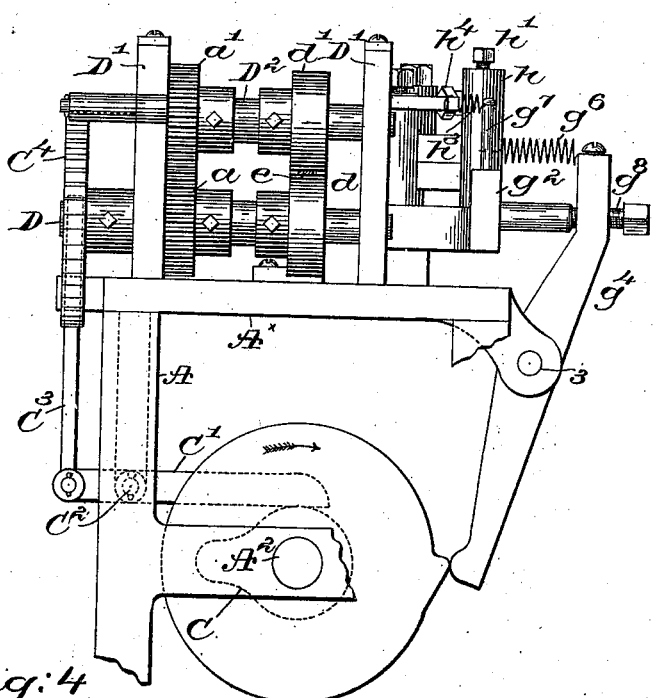
Figure 4:
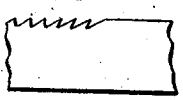

Figure 1, is a top or plan view of a sufficient portion of a saw-making machine with my improvements added to enable my invention to be understood; Fig. 2, a partial left-hand side elevation of the machine shown in Fig. 1. Fig. 3, is a partial front end view of the machine shown in Fig. 1, and, Fig. 4, shows much enlarged part of a saw to show the teeth in the condition in which they are left after each operation.

The frame-work A is, and may be, of suitable shape to support the working parts. This frame-work has bearings for a power-shaft $A^2$ upon which is secured two cams B and C.

The cam C acts upon one end of a lever $C'$, pivoted at $C^2$ and provided with a pawl $C^3$, said pawl, as represented best in Fig. 2, engaging the teeth of and rotating a ratchet-wheel $C^4$, fast on a shaft D having its bearings in suitable housings $D'$, erected on the frame-work. The pawl imparts to the said shaft an intermitting movement. The shaft has a pinion $a$, and a feed-wheel $d$, the pinion $a$ engaging a gear $a'$ on a shaft $D^2$ parallel to the shaft D and provided with the feed-wheel $d'$ directly over the wheel $d$. These feed wheels receive between them and feed intermittingly toward the forming-tools to be described the ribbon $e$, of metal to be formed into a saw. These feed wheels are substantially as in my Patent No. 339,641, except that they act intermittingly to feed the metal ribbon through a suitable guide $f$ attached to the frame-work and having a notch to expose the edge of the ribbon to be acted upon by the said tool, as shown in Fig. 1. A detent pawl $C^6$ prevents any retrograde movement of the ratchet-wheel $C^4$.

The table part of the frame-work marked $A^\times$ has a suitable stud 2 upon which is mounted loosely a lever $g^2$, said lever being acted upon by a strut $g^3$ one end of which is in turn acted upon by a screw or other device at the upper end of a lever $g^4$ pivoted at 3. The lever $g^2$ and the devices for actuating it are substantially as in my said patent, but herein the cam B for moving the lever $g^4$ is shaped somewhat differently. The spring $g^6$ connected at one end to the lever $g^4$ and at its other end to a pin $g^7$ normally keeps the screw $g^8$ against the lever $g^2$.

In this my present invention the metal ribbon is not moved up and down or vibrated as in the patent referred to, but has only a straight forward movement.

The tooth forming tool $g$ is mounted in a pivoted post $h$ and is held in adjusted position therein by a set screw $h'$, an arm $h^2$ of the post being connected by a spring $h^3$ with the stud $g^7$, the extent of the movement of the arm by the spring being, however, controlled by an adjusting device $h^4$ shown as a screw.

The hub $m$ of the lever $g^2$ is surrounded by the hub of the carrier $m'$ for the staking tool $m^2$, said staking tool being confined upon the said carrier by a suitable set screw $m^3$ inserted through a block $m^4$. A spring $m^5$ connected to a pin on the said block and to a screw $m^6$ acts to normally keep the carrier $m'$ against the inner end of an adjusting screw $n$.

The tooth forming tool $g$ and the staking tool $m^2$ are represented in Fig. 1 as so positioned one with relation to the other that while the forming tool is entering the edge of the metal ribbon to form a tooth, the staking tool is acting on the tooth next but one of the toothed notches. The lever $g^4$ vibrates the lever $g^2$ in the direction of the arrow Fig. 1, and during such movement both the tooth forming tool and the staking tool are moved to perform their work, and it will be noticed that during their movement in that direction both the arm $h^2$ and the carrier $m'$ rest fixedly against their respective stops $h^4$ and $m^6$, but when the lever $g^2$ is moved in the opposite direction the tooth-forming tool and staking tool are free to yield in the direction of the arrow 10, Fig. 1 and at such time the metal ribbon may be fed without being interfered with by the said tools. The tooth forming tool is forced into the edge of the metal ribbon and sets up or forms a tooth without removing any stock, and subsequently the staking tool enters the notch and acts upon the tooth thus formed at one edge and moves the same to change the angle of the front or cutting edge from the angle at which it was left by the tooth forming tool. The end of the staking tool is also preferably rounded, so that as it pushes the tooth back it will round or broaden the bottom of the notch between it and the next tooth, thus obviating any sharp angle which renders the teeth when hardened so liable to crack, such rounding or broadening also giving a free clearance for chips which might otherwise collect at the base of the teeth.

In practice I have found that a saw blade having its teeth staked or rounded out at the junction of the back of one tooth with the front or shoulder of another tooth works materially better and is stronger, and is more serviceable than a saw in which the teeth are left without being staked, and as they are formed by the tooth forming tool.

This invention is not limited to the precise form of mechanism shown for actuating the tooth forming tool and the staking tool, as many different forms of devices for that purpose might be devised without the exercise of other than mechanical skill.

I claim—

1. In a saw making machine, a tooth forming tool to enter the edge of a metal ribbon to form a tooth therein, combined with a staking tool to act upon the tooth and change the angle of its cutting edge, substantially as described.

2. In a saw making machine, feeding mechanism to feed a metallic ribbon, a guide for the said ribbon to expose one of its edges, and a tooth forming tool and a staking tool, combined with actuating devices for the said tools, whereby the tooth is first formed by the forming tool and the angle of its cutting edge thereafter changed by the staking tool, substantially as described.

3. The herein described improved method of manufacturing saws which consists in cutting into the edge of a metallic strip to form a tooth, and thereafter setting the said tooth back to change the angle of its cutting edge, substantially as described.

4. The herein described improved method of manufacturing saws which consists in cutting into the edge of a metallic strip to form a tooth, and thereafter staking the bottom of the notch between the back of one tooth and the front of an adjacent tooth to round or broaden the same, substantially as described.

In testimony whereof I have signed my name to this specification in the presence of two subscribing witnesses.

GEORGE W. GRIFFIN.

Witnesses:
JOHN P. PROCTOR,
ALEXIS PROCTOR.